(12) United States Patent
Li

(10) Patent No.: US 8,139,543 B2
(45) Date of Patent: Mar. 20, 2012

(54) COVERAGE-HOLE DETECTION AND SELF HEALING

(75) Inventor: Aihua Edward Li, Cupertino, CA (US)

(73) Assignee: Symbol Technologies, Inc., Holtsville, NY (US)

(*) Notice: Subject to any disclaimer, the term of this patent is extended or adjusted under 35 U.S.C. 154(b) by 770 days.

(21) Appl. No.: 12/250,802

(22) Filed: Oct. 14, 2008

(65) Prior Publication Data

US 2010/0091746 A1 Apr. 15, 2010

(51) Int. Cl.
*H04W 4/00* (2009.01)
*G08C 17/00* (2006.01)
*H04B 7/185* (2006.01)
*H04B 1/00* (2006.01)
*H04B 17/00* (2006.01)

(52) U.S. Cl. ........ 370/332; 370/311; 370/318; 370/333; 370/338; 455/63.2; 455/67.11

(58) Field of Classification Search .......... 370/318, 370/332
See application file for complete search history.

(56) References Cited

U.S. PATENT DOCUMENTS

| | | | | |
|---|---|---|---|---|
| 6,356,309 | B1* | 3/2002 | Masaki et al. | 348/439.1 |
| 7,313,113 | B1* | 12/2007 | Hills et al. | 370/332 |
| 2006/0075131 | A1* | 4/2006 | Douglas et al. | 709/230 |
| 2006/0104340 | A1* | 5/2006 | Walton et al. | 375/227 |
| 2009/0232036 | A1* | 9/2009 | Marx | 370/311 |

* cited by examiner

*Primary Examiner* — Jeffrey Pwu
*Assistant Examiner* — Kodzovi Acolatse

(57) ABSTRACT

A system, apparatus and techniques for detecting and self-healing coverage hole conditions in a wireless network are disclosed. The apparatus includes a monitor module that is configured in a data forwarding plane of a network switch and a regulatory module configured in a control plane of the switch. The monitor module is configured to detect a coverage hole condition affecting a mobile device associated with an access port and the regulatory module is configured to adjust transmission power to the access port based on the condition.

11 Claims, 4 Drawing Sheets

COVERAGE-HOLE DETECTION AND SELF HEALING

TECHNICAL FIELD

This disclosure relates to wireless networks and, more particularly to coverage hole detection and self-healing in wireless networks.

BACKGROUND

In a wireless network, there can be one or more areas where the signal strength provided to network devices is poor. These areas, commonly known as coverage holes, can reduce packet transfer rates from wireless mobile units (MU) as well as limit or prohibit network access to wireless mobile units. Possible causes for such coverage holes can include inadequate or imperfect site planning, as well as environmental factors that can affect the effective transmission of electromagnetic signals.

In some instances, it can be difficult to determine whether a MU is in a coverage hole as the signal received by an MU is typically not reported back to the AP. In addition, it would be a burden to request each of the various MU manufactures to communicate this signal information back to the AP using a universally agreed upon protocol. Furthermore, it is difficult to regulate the power of access ports such that it is not excessive. For example, when a MU moves out of a coverage hole, it can be inefficient for an AP to maintain an increased power level.

Accordingly, there is a need for an improved approach to coverage hole detection and self-healing in wireless networks.

SUMMARY

A system, apparatus and techniques for detecting and self-healing coverage hole conditions in a wireless network are disclosed. The apparatus includes a monitor module that is configured in a data forwarding plane of a network switch and a regulatory module configured in a control plane of the switch. The monitor module is configured to detect a coverage hole condition affecting a mobile device associated with an access port and the regulatory module is configured to adjust transmission power to the access port based on the condition.

For example, according to one aspect, an apparatus includes a monitor module configured in a data forwarding plane of a network switch. The monitor module is configured to detect a coverage hole condition affecting a mobile device associated with an access port. The switch also includes a regulatory module configured in a control plane of the network switch. The regulatory module is configured to adjust a transmission power to the access port in response to detection of the coverage hole condition.

In one embodiment, the monitor module calculates transmission throughput of the access port. The monitor module can calculate the transmission throughput by multiplying a number of data bytes transmitted by the access port by a data rate for each of the number of data bytes transmitted, and summing each of the multiplied numbers.

The monitor module also can compare the transmission throughput to a target throughput associated with the access port and detect the coverage hole condition based on the comparison. The target throughput can be based on an 802.11 specification. The monitor module also can maintain a transmission data byte counter for the mobile device.

In an embodiment, the regulatory module determines the transmission power adjustment by determining a signal sensitivity difference between the transmission throughput and a target throughput of the access port using a sensitivity data store. The sensitivity data store includes a plurality of bit rates with associated signal sensitivities for each of the plurality of bit rates. The regulatory module also can store the transmission power adjustment in a radio structure of the switch.

In one embodiment, the regulatory module adjusts the transmission power after a delayed time interval. The regulatory module can adjust the transmission power in power increments.

In another aspect, a method includes monitoring transmission throughput of an access port associated with a mobile device from a data forwarding plane of a network switch, and detecting a coverage hole condition affecting the mobile device based on the monitoring. The method also includes adjusting a transmission power to the access port from a control plane of the network switch in response to detection of the coverage hole condition.

In one embodiment, the method includes calculating a transmission throughput of the access port. Calculating the transmission throughput can include multiplying a number of data bytes transmitted by the access port by a data rate for each of the number of data bytes transmitted, and summing each of the multiplied numbers.

In an embodiment, the method includes comparing the transmission throughput to a target throughput associated with the access port, and detecting the coverage hole condition based on the comparison.

In one embodiment, determining the transmission power adjustment includes determining a signal sensitivity difference between the transmission throughput and a target throughput of the access port using a sensitivity data store. The sensitivity data store includes a plurality of bit rates and a signal sensitivity associated with each of the plurality of bit rates.

The method can also include storing the transmission power adjustment in a radio structure of the switch. The method can also include adjusting the transmission power after a delayed time interval. For example, the method can include adjusting the transmission power in increments.

Several advantages can be obtained using the present invention. For example, consider the situation in which a user performs an inventory function in a warehouse using a handheld scanner. The user may walk isle by isle and enter a coverage hole caused by some temporary shelf change. Once the coverage hole condition is detected, the system can be used to respond quickly by increasing the power provided to the scanner, thus minimizing the effect of the hole on the scanner.

Additional features and advantages will be readily apparent from the following detailed description, the accompanying drawings and claims.

BRIEF DESCRIPTION OF DRAWINGS

Like reference symbols in the various drawings indicate like elements.

DETAILED DESCRIPTION

Figure 1:
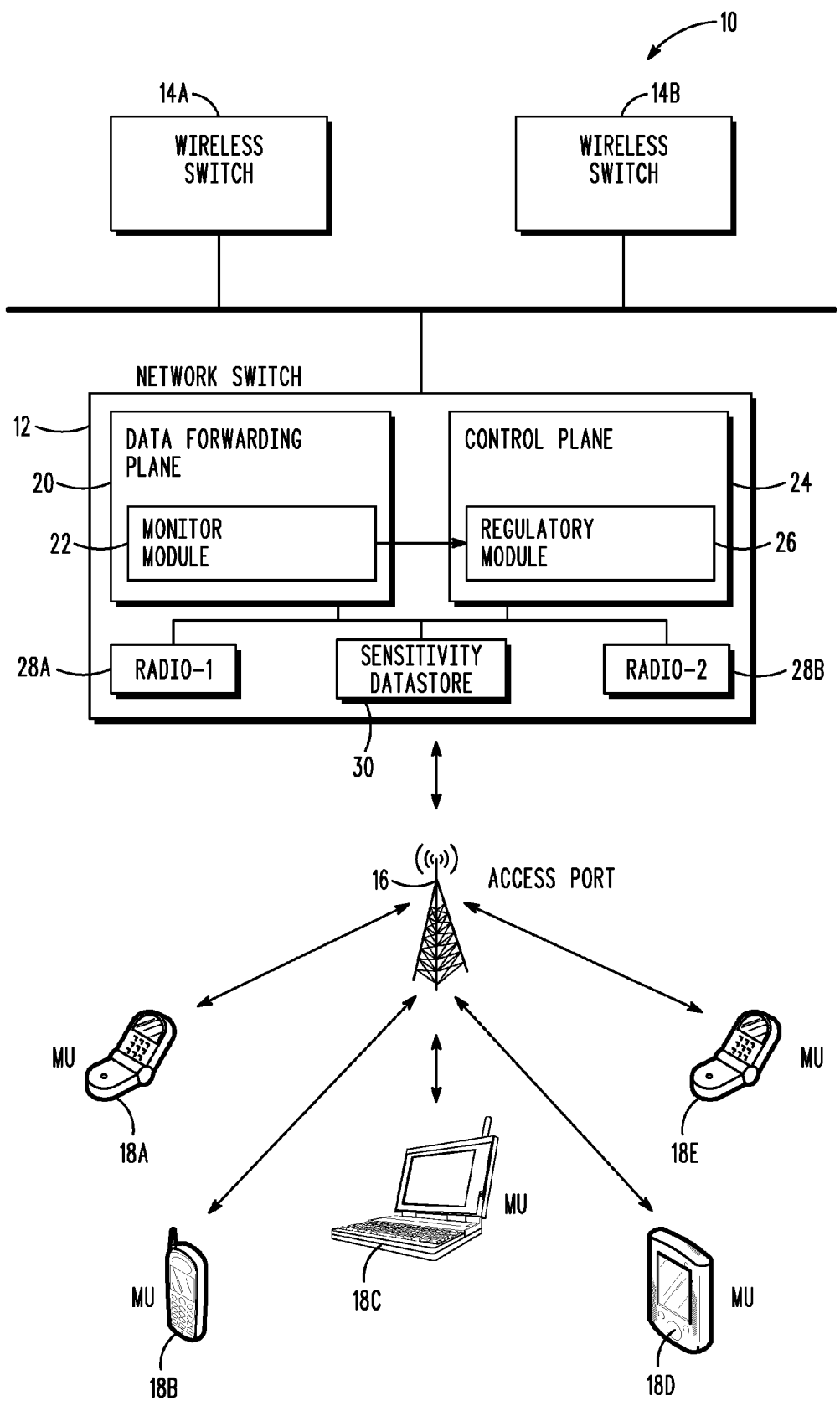
FIG. 1 is a block diagram of a system for detecting and self-healing a coverage hole in a wireless network according to the present invention.

FIG. 1 is a schematic representation of a computer network 10 configured in accordance with an example embodiment of the invention. In this example, computer network 10 is configured as a WLAN. Computer network 10 generally includes wireless mobile units identified by reference numbers 18A-E, a plurality of wireless switches 14A-B, a network switch 12, and a wireless access device 16. Computer network 10 may include or communicate with any number of additional network components, such as a traditional local area network ("LAN'). A practical embodiment can have any number of wireless switches, each supporting any number of wireless access devices, and each wireless access device supporting any number of wireless mobile units. Indeed, the topology and configuration of computer network 10 can vary to suit the needs of the particular application and FIG. 1 is not intended to limit the application or scope of the invention in any way.

The wireless access device 16 is a wireless access port, which is a "thin" device that relies on network intelligence and management functions provided by the network switch 12. The wireless access port 16 as described herein is configured to receive data from the mobile units 18A-E over wireless links. Once data is captured by the wireless access device, the data is processed for communication within computer network 10. For example, the data can be encapsulated into a packet format compliant with a suitable data communication protocol. In the example embodiment, data is routed within computer network 10 using conventional Ethernet 802.3 addressing (including standard Ethernet destination and source packet addresses). In alternate embodiments, data can be routed within computer network 10 using conventional Internet Protocol ("IP") techniques. In one embodiment, the wireless access port 16 stores the number of data bytes transmitted from each of the mobile units 18A-E.

As shown in FIG. 1, in one embodiment, the network switch 12 can be an Ethernet switch, which is in turn operationally coupled to the wireless access device 16. In practice, the wireless switches 14A-B can communicate with the wireless access device 16 via the network switch 12. The wireless mobile units 18A-E are wireless devices that can physically move around computer network 10 and communicate with network components via the wireless access device 16. Examples of mobile units include, but are not limited to, cellular phones, smart phones, personal digital assistants (PDA), and laptop computers.

The network switch 12 is configured to include a data forwarding plane 20, a control plane 24, a sensitivity data store 30, and one or more radios 28A-B. The radios 28A-B included in the switch 12 can operate at one or more frequencies. For example, in one embodiment, one of the radios operates on a 2.4 Ghz. frequency and the other radio operates on a 5 Ghz. frequency. Of course, it will be appreciated by one skilled in the art that the number of radios included in the switch 12 of FIG. 1 is not intended to limit the application or scope of the invention in any way.

The data forwarding plane 20 of the switch 12 determines how to route data packets arriving on an inbound interface of the switch 12. As shown in FIG. 1, in one embodiment, the data forwarding plane of the switch is configured to include a monitor module 22 that can detect coverage hole conditions in the network 10. In one embodiment, the monitor module is a stateless monitor. Details of the monitor module 22 are discussed in connection with FIG. 2.

The control plane 24 manages operational aspects of the switch 12, except the per-packet analysis and delivery of data packets arriving on an inbound interface of the switch 12, and configuration aspects of the wireless access device 16. As shown in FIG. 1, in one embodiment, the control plane 24 includes a regulatory module 26 that is configured to adjust transmission power to the wireless access device 16 in response to detection of a coverage hole condition. Details of the regulatory module are discussed in connection with FIG. 3.

Figure 4:
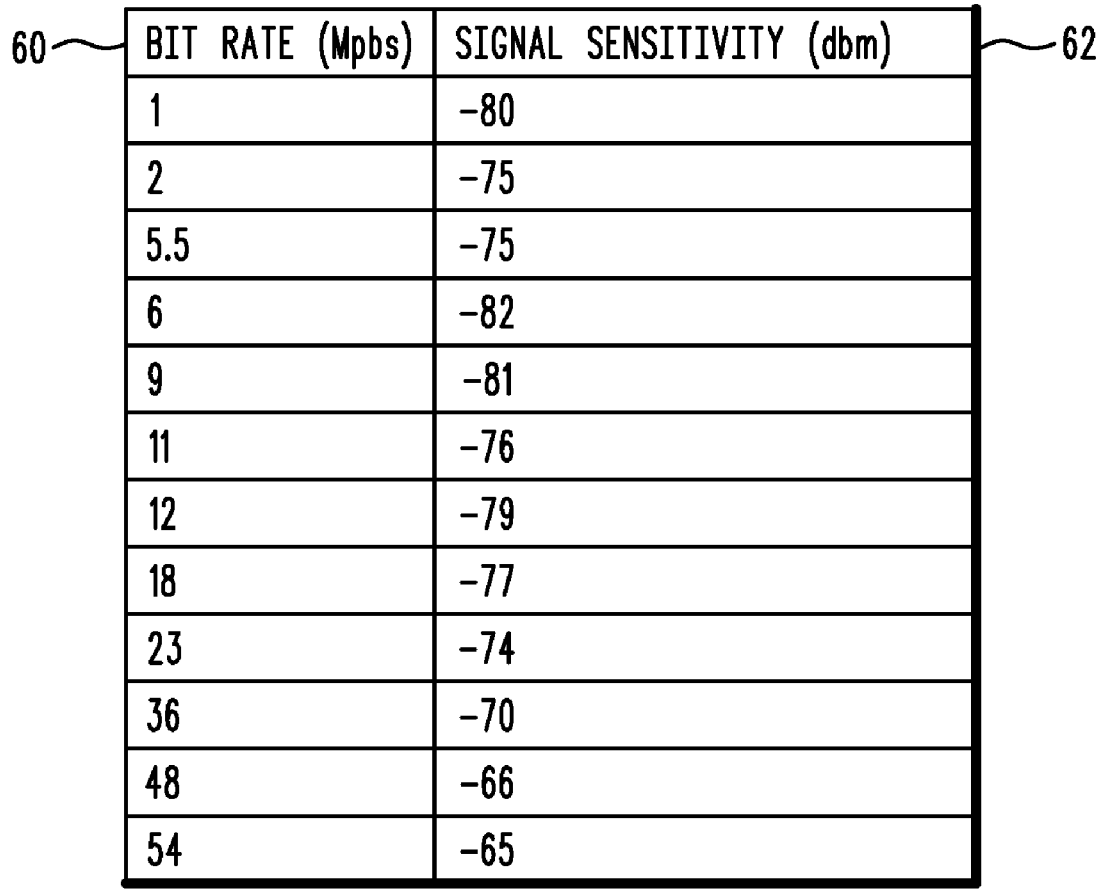
FIG. 4 illustrate data values stored in a sensitivity data store according to the present invention.

Referring to FIG. 4, the sensitivity datastore 30 provides bit rate and associated signal sensitivity information to both the monitor module 22 and the regulatory module 26. The bit rate and signal sensitivity information can be derived from the IEEE 802.11 specification. For example, in the embodiment shown in FIG. 4, the bit rate is specified in mega-bits per second (Mbps) and the associated signal sensitivity is specified in dBm representing the power ratio in decibels of measured power referenced to one milliwatt (mW). Accordingly, for any given 802.11 compliant mobile unit, the mobile unit preferably sustains the bit rate at the left column 60 given the signal strength provided by the wireless access device 16 by the right column 62. For example, a given MU preferably can sustain 18 Mbps when the supplied signal strength from the access device 16 is −77 dBm. Of course, it is possible that a mobile unit can achieve a higher rate than specified by the IEEE 802.11 standard.

In one embodiment, the sensitivity datastore 30 is a relational database that provides the bit rate and signal sensitivity information to various system components. In another embodiment, the sensitivity datastore 30 is a directory server, such as a Lightweight Directory Access Protocol ('LDAP') server, that provides bit rate and signal sensitivity information. In other embodiments, the sensitivity datastore 30 is a configured area in the memory of the switch 12 that provides the bit rate and signal sensitivity information. It will be appreciated by one skilled in the art that sensitivity datastore 30 can be used to not only provide bit rate and sensitivity information but may also be used to store data.

During network planning, a site planner typically assigns a certain throughput number in the middle range of the available rates. This rate is referred to as a coverage rate in this disclosure.

Figure 2:
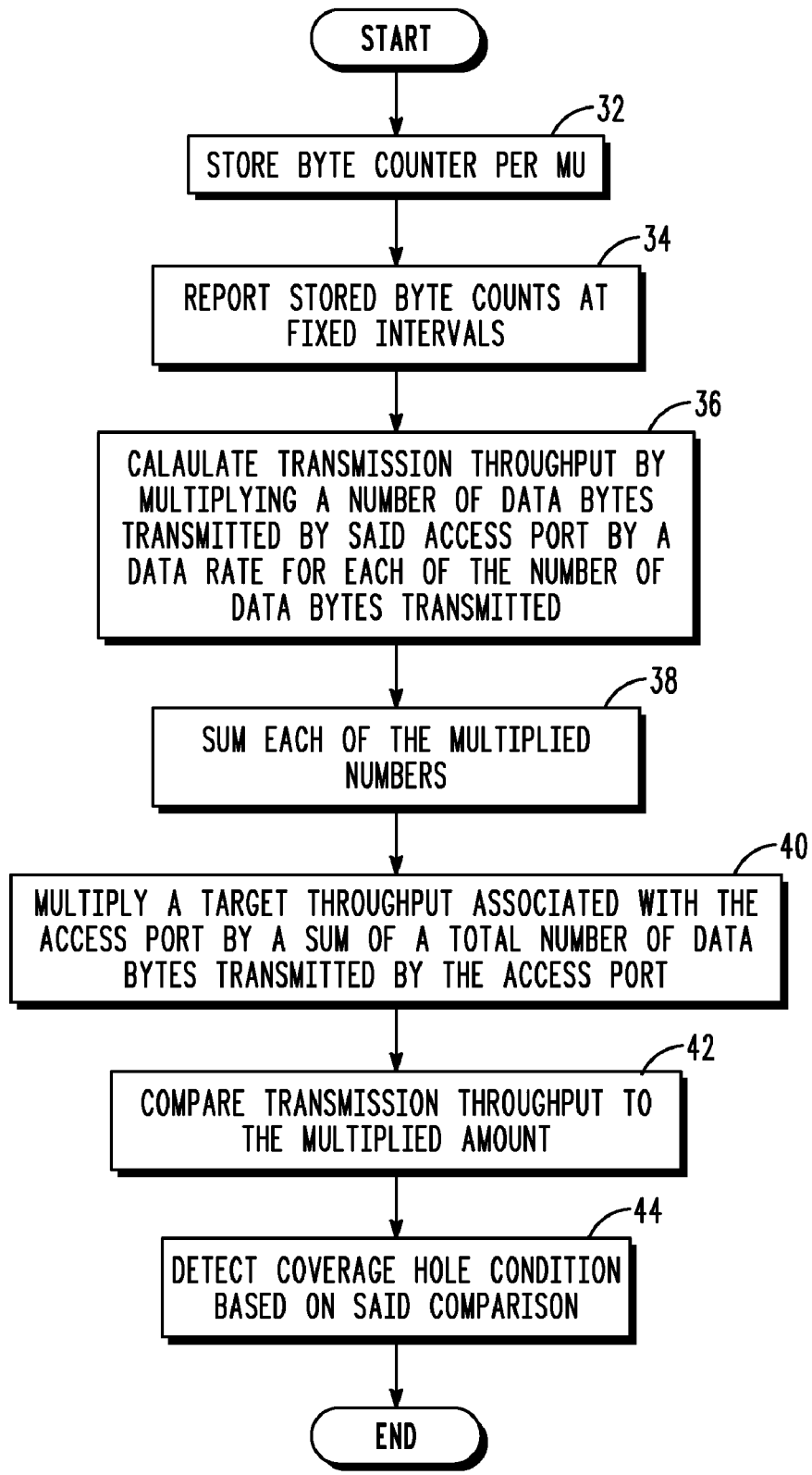
FIG. 2 is a flow chart of example steps executed by a monitor module according to the present invention.

Referring now to FIG. 2, a method executed by the monitor module 22 to detect a coverage hole condition is disclosed. First, for each mobile unit associated with an access port on each radio 28A-B, a byte counter array is established 32. Next, in one embodiment, the access port 16 maintains the byte counter array per mobile unit with associated time and periodically updates the counter with throughput information. The byte counter array can be maintained by a thin AP in a histogram format and be forwarded to the monitor module 22 at fixed time intervals 34. In another embodiment, the data plane of the network switch maintains the byte counter array. Next, if the number of data packets transmitted to the mobile unit is greater than a threshold number of packets, e.g., ten (10) packets, the monitor module 22 calculates a transmission throughput for the access port 16 by first multiplying the byte count by the data rate these bytes transmitted 36. Next, the monitor module 22 sums each of the multiplied numbers 38. Next, the monitor module 22 multiplies a target/coverage rate throughput associated with the access port 16 by the total number of data bytes transmitted 40 by the access port 16. The monitor module 22 then compares the calculated rate-weighted byte counts to the multiplied amount 42. For example, in one embodiment, the monitor module 22 calculates the throughput as a weighted sum average of the histogram and performs a comparison using the following operation:

$$\Sigma(\text{delta\_bytes}[i]*\text{rate}[i]) < \text{target\_rate}*\Sigma(\text{delta\_total\_bytes}[i])$$

where delta_bytes[i] is the byte count sent at rate[i] from the mobile unit at a particular time interval, delta_total_bytes[i] is the total number of data bytes sent from the mobile unit at the particular time interval, and target_rate is the coverage rate. Advantageously, by performing the above calculations and comparison without a division operation, packet forwarding operations performed by the data forwarding plane 20 are not negatively affected as division operations are time consuming. If the sum of the rate-weighted byte count is less than the coverage rate multiplied by the sum of the total number of bytes, the monitor module 22 determines that a coverage hole condition exists 44. If the rate measured is above the target rate, the network 10 is operating normally and no coverage hole exists.

Figure 3:
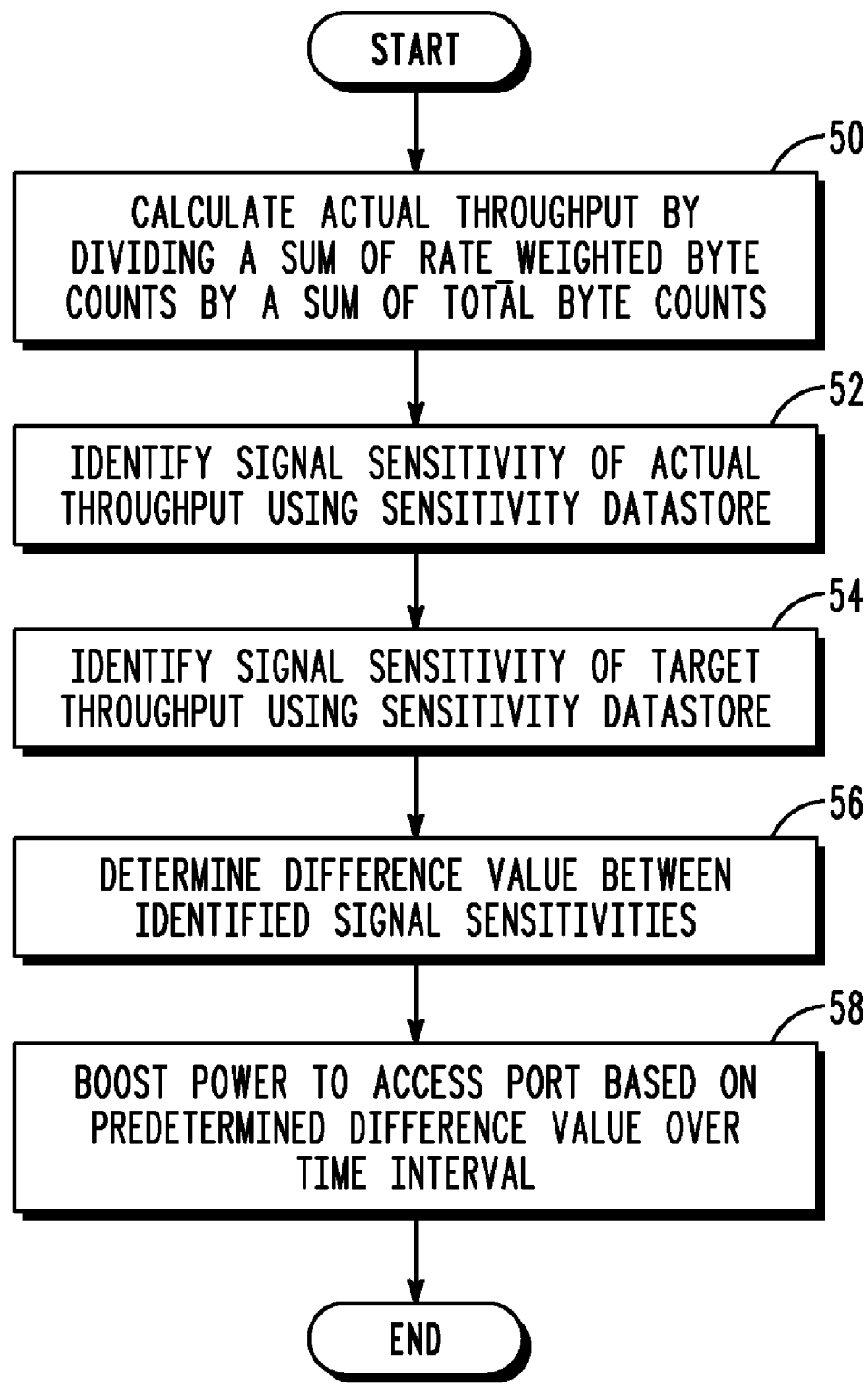
FIG. 3 is a flow chart of example steps executed by a regulatory module according to the present invention.

Referring now to FIG. 3, a method executed by the regulatory module 26 is disclosed. As shown in FIG. 3, first, in response to receiving coverage hole detection information from the monitor module 22, the regulatory module 26 first calculates the actual throughput by dividing the rate-weighted byte-count 38 by the total byte-count 50. For example, in one embodiment, the regulatory module 26 calculates the actual throughput using the following operation:

$$\Sigma(\text{delta\_bytes}[i]*\text{rate}[i])/\Sigma(\text{delta\_total\_bytes}[i])$$

where delta_bytes[i] is the byte count sent at rate[i] from the mobile unit at a particular time interval and, delta_total_bytes is the total number of data bytes sent from the mobile unit at the particular time interval. Note, as this operation occurs in the control plane 24, the division operation is not as costly as if it would be if executed in the data forwarding plane 20.

Next, the regulatory module 26 identifies the signal sensitivity of the calculated actual throughput 52. This can be a lookup of information stored in the sensitivity data store 30. Next the regulatory module 26 identifies the signal sensitivity of the target throughput using information stored in the sensitivity datastore 54. The regulatory module 26 then determines a difference value between the identified signal sensitivities 56 and boosts power to the access port 16 based on the determined difference value over a time interval 58. This calculated difference value is stored in a radio structure of the switch and can be scheduled to take effect at a particular time interval. For example, referring to FIG. 4, if the rate measured is 9 Mbs and the target/coverage rate is 18 Mbs, the power boost is (−77 dBm)-(−81 dBm) which equals 4 dBm. In one embodiment, the power boost is incremented in 1 dBm steps. In another embodiment, the power boost is immediately increased to the desired level without a delay.

In one embodiment, once the power is boosted, the mobile unit may no longer experience a lower coverage rate. As such, the power is stepped down at a slower rate, e.g., −1 dBm every five (5) seconds. If the mobile unit remains in the coverage hole, the regulatory module 26 continues to receive measurement information from the monitor module 22 and thereby maintains the increased power level at a steady state.

It will be appreciated by one skilled in the art that more than one mobile unit can be affected by a coverage hole condition. As such, the boosting power calculated for each device can be different. To address this issue, in one embodiment, the boost power is not immediately applied by the regulatory module 26 but is delayed by some amount time, e.g., a second, from the time of the first coverage hole condition. Any newer coverage hole condition results in a re-computing of boost power. If the new recomputed boost power is greater than the previous boost power calculation, the greater boost power overrides and is applied to the access port 16.

Eventually, as the coverage hole problems are resolved due to mobile units moving to a better transmission/reception area of the network 10, the power boost to the access port 16 reverts to its original value finishing the coverage hole self-healing action.

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. An apparatus comprising:
    a monitor module configured in a data forwarding plane of a network switch, said monitor module configured to calculate transmission throughput of an access port and detect a coverage hole condition affecting a mobile device associated with the access port based on the transmission throughput;
    a regulatory module configured in a control plane of said network switch, said regulatory module configured to increase a transmission power of said access port in response to detection of said coverage hole condition;
    wherein said monitor module calculates said transmission throughput by multiplying a number of data bytes transmitted between each mobile device and said access port by a data rate for each of said number of data bytes transmitted, and summing each of said multiplied numbers; and
    wherein said monitor module multiplies a target throughput associated with said access port by a sum of a total number of data bytes transmitted between said access port and the mobile devices, compares said transmission throughput to said multiplied amount, and detects said coverage hole condition based on said comparison.

2. The apparatus of claim 1, wherein said regulatory module determines said transmission power increase by determining a signal sensitivity difference between said transmission throughput and a target throughput of said access port using a sensitivity data store, said sensitivity data stores comprising a plurality of bit rates and a signal sensitivity associated with each of said plurality of bit rates, wherein the power increase equals the signal sensitivity difference.

3. The apparatus of claim 2, wherein said regulatory module calculates actual throughput by dividing a rate-weighted byte-count by a total byte count.

4. The apparatus of claim 1, where said regulatory module increases said transmission power after a delayed time interval during which a second calculation for transmission throughput of the access port to detect a coverage hole condition is performed.

5. The apparatus of claim 1, wherein after a power increase said regulatory module decreases said transmission power in increments.

6. A method comprising:
calculating a transmission throughput of an access port associated with a mobile device from a data forwarding plane of a network switch;
detecting a coverage hole condition affecting said mobile device based on said monitoring calculation of transmission throughput;
increasing a transmission power of said access port from a control plane of said network switch in response to detection of said coverage hole condition;
wherein said calculating comprises multiplying a number of data bytes transmitted between each mobile device and said access port by a data rate for each of said number of data bytes transmitted, and summing each of said multiplied numbers; and
multiplying a target throughput associated with said access port by a sum of a total number of data bytes transmitted between said access port and the mobile devices;
comparing said transmission throughput to said multiplied amount; and detecting said coverage hole condition based on said comparison.

7. The method of claim 6, wherein increasing said transmission power comprises determining a signal sensitivity difference between said transmission throughput and a target throughput of said access port using a sensitivity data store, said sensitivity data stores comprising a plurality of bit rates and a signal sensitivity associated with each of said plurality of bit rates, wherein the power increase equals the signal sensitivity difference.

8. The method of claim 7, comprising calculating actual throughput by dividing a rate-weighted byte-count by a total byte count.

9. The method of claim 6, comprising increasing said transmission power after a delayed time interval during which a second calculation for transmission throughput of the access port to detect a coverage hole condition is performed.

10. The method of claim 6, comprising after a power increase decreasing said transmission power in increments.

11. A network system comprising:
an access port providing communicating with at least one mobile device;
a network switch in communication with said access port, said network switch including a monitor module configured in a data forwarding plane of a network switch, said monitor module configured to calculate transmission throughput of an access port and detect a coverage hole condition affecting a mobile device associated with the access port based on the transmission throughput, and a regulatory module configured in a control plane of said network switch, said regulatory module configured to increase a transmission power to said access port in response to detection of said coverage hole condition;
wherein said monitor module calculates said transmission throughput by multiplying a number of data bytes transmitted between each mobile device and said access port by a data rate for each of said number of data bytes transmitted, and summing each of said multiplied numbers; and
wherein said monitor module multiplies a target throughput associated with said access port by a sum of a total number of data bytes transmitted between said access port and the mobile devices, compares said transmission throughput to said multiplied amount, and detects said coverage hole condition based on said comparison.

* * * * *

UNITED STATES PATENT AND TRADEMARK OFFICE
CERTIFICATE OF CORRECTION

PATENT NO. : 8,139,543 B2  Page 1 of 1
APPLICATION NO. : 12/250802
DATED : March 20, 2012
INVENTOR(S) : Li It is certified that error appears in the above-identified patent and that said Letters Patent is hereby corrected as shown below:

In Fig. 2, Sheet 2 of 4, for Tag "36", in Line 1, delete "CALAULATE" and insert -- CALCULATE --, therefor.

In Column 3, Line 12, delete "("LAN')." and insert -- "("LAN")." --, therefor.

Signed and Sealed this
First Day of January, 2013

David J. Kappos
*Director of the United States Patent and Trademark Office*